United States Patent
Gignac

[19]
[11] Patent Number: 6,125,956
[45] Date of Patent: *Oct. 3, 2000

[54] VEHICLE ON TRACKS

[76] Inventor: Guy Gignac, 1880 St-Charles, Porneuf Station, Quebec, Canada, G0A 3Z0

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,453

[22] Filed: Sep. 29, 1997

[30]  Foreign Application Priority Data

Jul. 18, 1997 [CA] Canada ................................. 2209022

[51] Int. Cl.[7] .................................................. B62D 55/06
[52] U.S. Cl. ............................................. 180/9.1; 305/181
[58] Field of Search .................................... 305/180, 181; 180/9.1

[56]  References Cited

U.S. PATENT DOCUMENTS

| | | | |
|---|---|---|---|
| 1,579,245 | 4/1926 | Pennington | 305/134 |
| 2,116,835 | 5/1938 | Kegresse | 305/134 |
| 3,113,805 | 12/1963 | Nodwell | 305/15 |
| 3,148,920 | 9/1964 | Nodwell | 305/181 |
| 3,688,858 | 9/1972 | Jespersen | 180/9.62 |
| 3,853,359 | 12/1974 | Pusch | 305/181 |
| 4,232,753 | 11/1980 | Carlson | 180/9.2 R |
| 4,433,634 | 2/1984 | Coast | 114/270 |
| 4,758,055 | 7/1988 | Anderson | 305/180 |
| 4,844,562 | 7/1989 | Ranner | 305/193 |
| 4,893,883 | 1/1990 | Satzler | 305/146 |

*Primary Examiner*—Kevin Hurley
*Assistant Examiner*—Andrew J. Fischer

[57]  ABSTRACT

An all-terrain vehicle comprising in combination:

a central frame having two parallel sides each one comprising:

a toothed wheel (50) mounted on one side of the central frame at the front, two pivoting suspension tandems mounted on a support fixed on the side of the frame, a track surrounding, without prior tension, the wheels and tandems, a return wheel (92) aligned with the tandems and keeping the track around them. The track comprises a pair of elastomer bands (38, 40) disposed at a certain distance from each other; stoppers (33) are also disposed around the bands, and comprise a traction bar (34) transversally binding a band to another; two triangular guides (36) are installed inside a band and spaced outwardly to demarcate a tread (42) to receive successively wheels and tandems. A fixing bolt (74) holds the guide and the traction bar across the band. A second toothed wheel is mounted on the opposite side of the central frame and power driven independently.

3 Claims, 6 Drawing Sheets

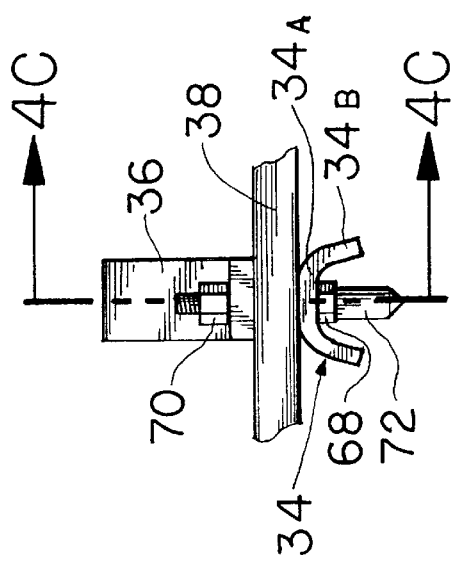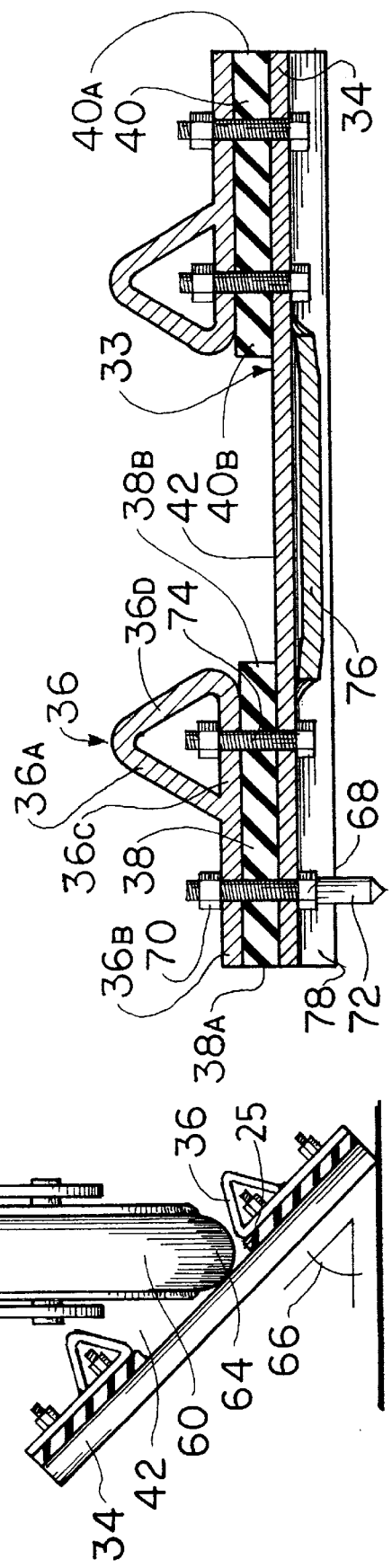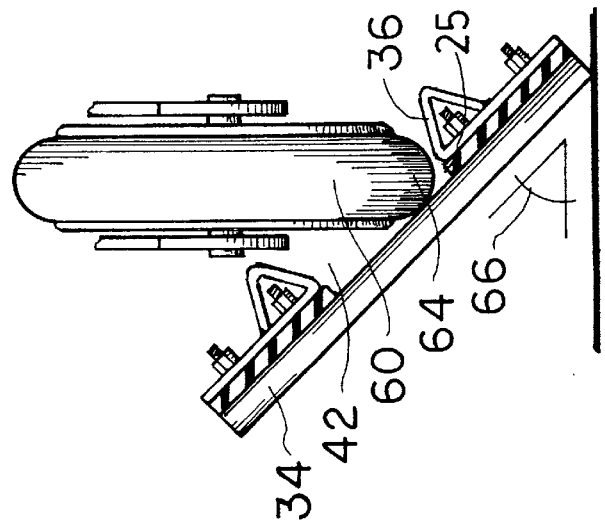

VEHICLE ON TRACKS

STATEMENT REGARDING FEDERALLY SPONSORED RESEARCH OR DEVELOPMENT

Not applicable

REFERENCE TO A "MICROFICHE APPENDIX" (SEE 37 CFR 1.96)

Not applicable

BACKGROUND OF THE INVENTION

1. Field of the Invention

This invention relates to the field of forest and all-terrain transport apparatus and is directed to tracks for an all terrain vehicle.

2. Description of the Related Art

Some patents have particularly drawn our attention:

U.S. Pat. No. 4,232,753 Carlson Oct. 25, 1978. Only one tandem without a trailer. It uses a full size return wheel. The tracks are entirely made of steel. The vehicle turns on a set of tires comprising two large tires and three small ones. The track pulls from the upper part but the tire is not as effective as a toothed wheel and can bring the tire to slip on the track. The bearing is done on three wheels, that is the two of the tandem and the one of the fixed rear axle.

U.S. Pat. No. 1,579,245; Pennington; Apr. 6, 1926. Two tandems and leaf springs. The system adds a track tensioner , located at the rear and pushing on the axle of a big rear wheel. A second big wheel is a traction wheel and placed in front. The weight of the machine is supported by six (6) wheels. The system serves a mechanical machine spaced out, a number of pads disposed along the length of a band and joining the two bands together, each pad having a traction bar on an outer side of the band and a pair of guides in the inner side of the band and facing the two bands, the space left by the pad between the two guides serving to channel the passage of the wheels, each track being without prior tension for a better grip with the ground, without causing too much damage.

BRIEF DESCRIPTION OF THE SEVERAL VIEWS OF THE DRAWINGS

Relative to the drawings that illustrate an embodiment of the invention

FIG. 4A is a diagram of a wheel engaging on a pad.

FIG. 4B is a lateral view of the pad.

FIG. 4C is a cut according to line 4C—4C of FIG. 4B.

DETAILED DESCRIPTION OF THE INVENTION

In the description that follows and in accompanying drawings similar numbers go back to identical parts in the diverse figures.

Figure 1:
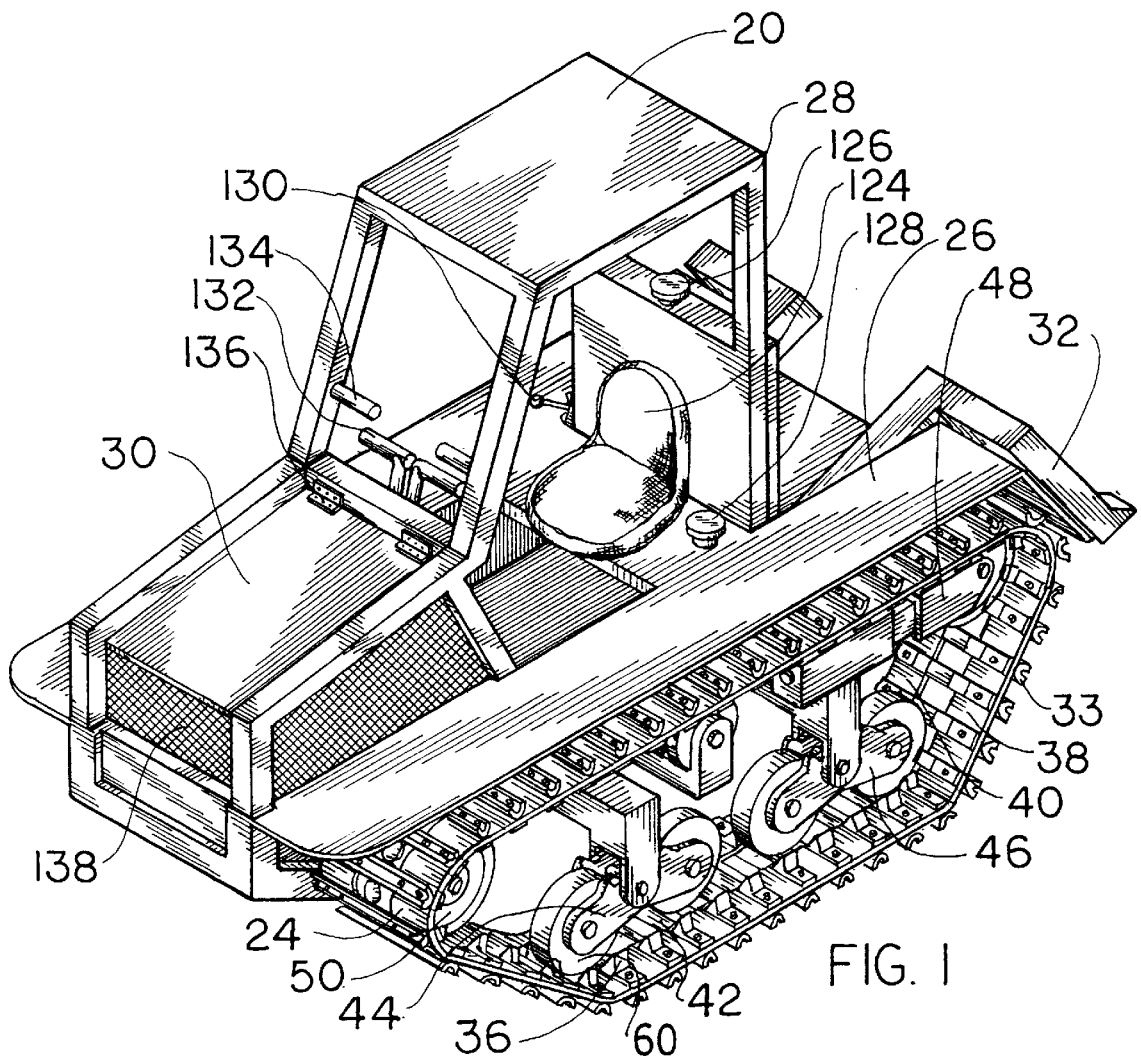
FIG. 1 is a perspective of an all-terrain vehicle.
Figure 6:
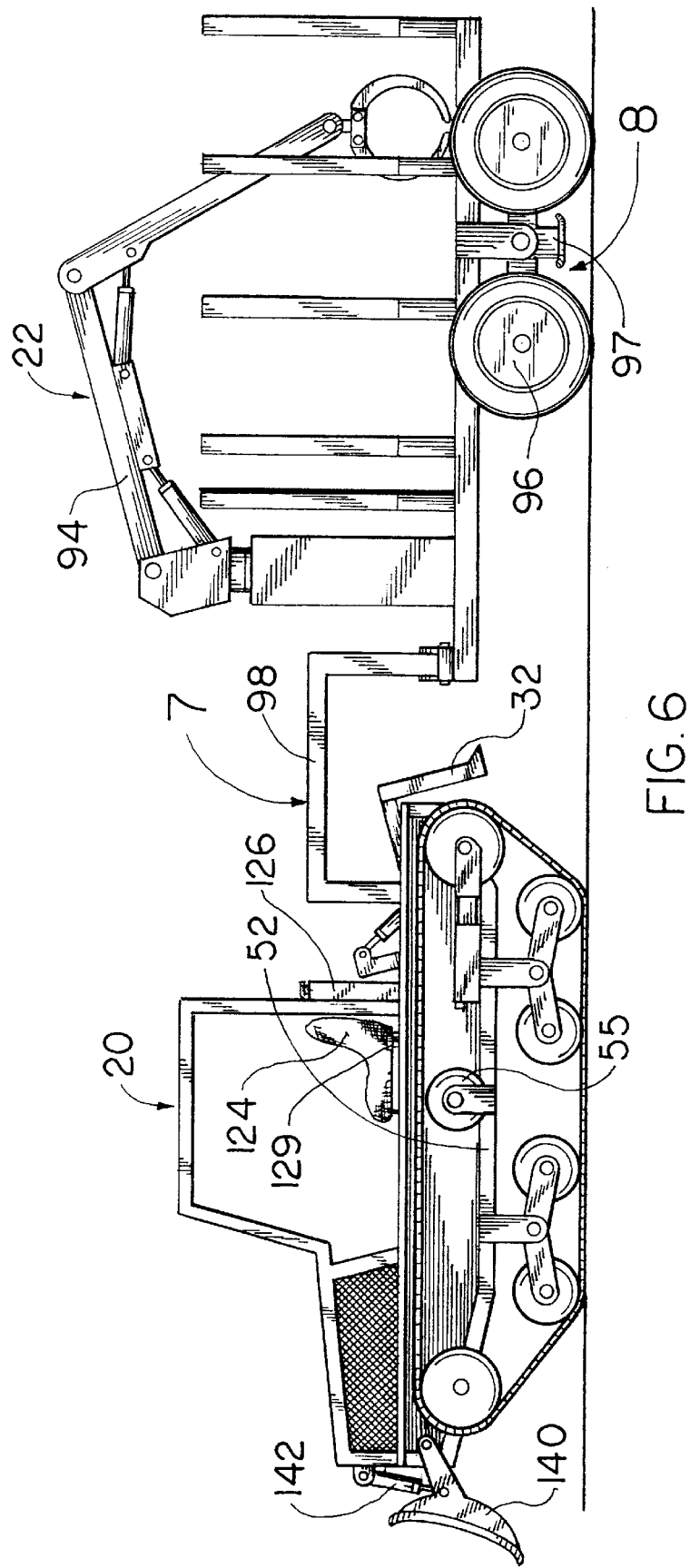
FIG. 6 is a side view of the vehicle towing a trailer

On FIG. 1 one can see an all terrain vehicle 20 of light weight and dimension, that can be carried in a van of ¾ ton and that can be used as a tree handler, when used alone, and/or as transport , when coupled to a trailer 22—FIG. 6—, for the precommercial or selective cut of wood. but can overcome obstacles with difficulty because of the presence of the big front wheel with which the contact with an obstacle is lower than if a smaller toothed wheel, off centre toward the top, had been used. The track comprises only a few guides to prevent the track from slipping laterally.

U.S. Pat. No. 2,116,835; Kegresse; May 10, 1938. Two tandems mounted on a tandem girder according to a central machine pivot, attached to a return pulley on oscillating arm. It uses two tandems located centrally and two big wheels. On each tandem is an elastomeric suspension that allows a tandems deflection of about 15°. It also uses a central guide that does not allow a lateral deflection of the track, especially not one that goes up to 45°.

BRIEF SUMMARY OF THE INVENTION

It's a general objective of the invention to provide a light tracked vehicle of small dimensions that simulates the movement of a horse which pulls a charge across obstacles. To provide a dislodgement, with tracks exempt of tension, thus allowing debris to pass between the wheels and the track, and cause very little pressure against the ground, especially on soft grounds. To give the forest workers an economic and compact vehicle more adapted and especially more secure than all-terrain vehicles (ATV) that do not protect a driver against tree falls or vehicle overturns. The vehicle may have a traction capacity much superior to that of all-terrain vehicles and horses. Particularly to provide a tree handler a vehicle that comprises a frame having a pair of vertical faces on which the wheels are mounted, each face providing support to a toothed wheel, to a pair of tandems and to a wheel rail provided with a positioner.

To provide a pair of tracks, each track comprising two bands slightly One sees a track 24, an overlaying wing 26, a cabin 28 that serves as a protection structure, a compartment cover 30 hinged at 136 and fitted with a front screen 138 and a log shovel 32 at the back. Vehicle 28 also includes a driver's seat 124, a radiator 126, a fuel tank cap 128 for a fuel tank 129 (FIG. 6), an accelerator lever 130, steering levers 132 and hold handles 134. The track 24 comprises pads 33, each including a traction bar 34 and two wheel guides 36, an outer elastomeric band 38 and an inner elastomeric band 40, a tread 42 between the wheel guides 36, a front tandem 44, a rear tandem 46 for positioning a return wheel 92 (FIG. 5), a positioner 48 attached to the rear tandem, a left toothed wheel 50 located to the left front side of the cabin.

Figure 2:
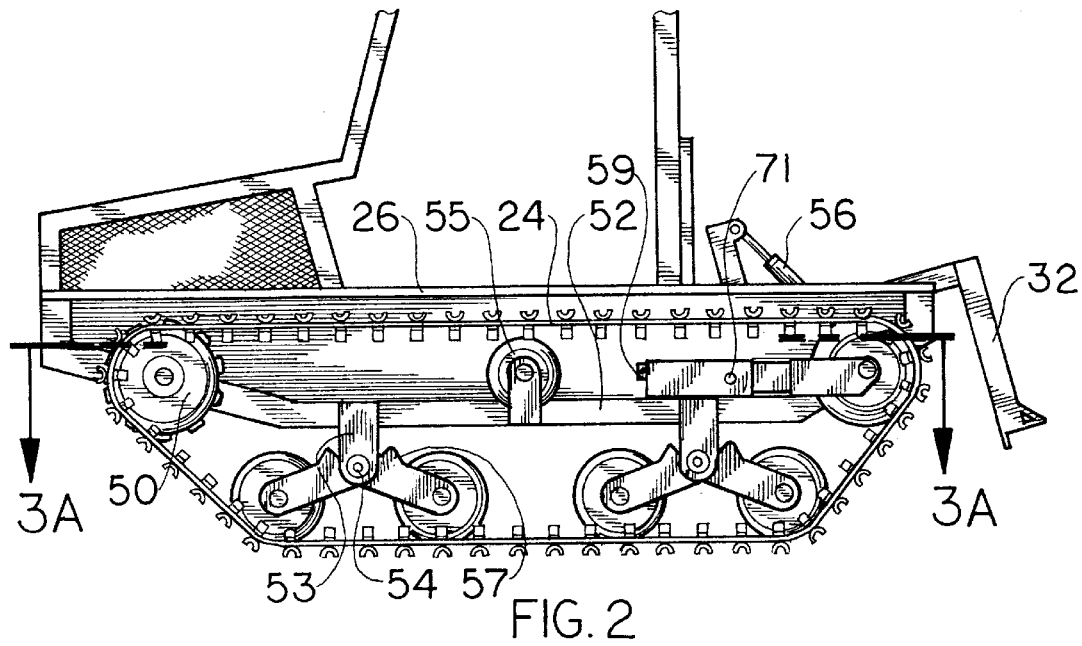
FIG. 2 is a side view of the vehicle.
Figure 3A:
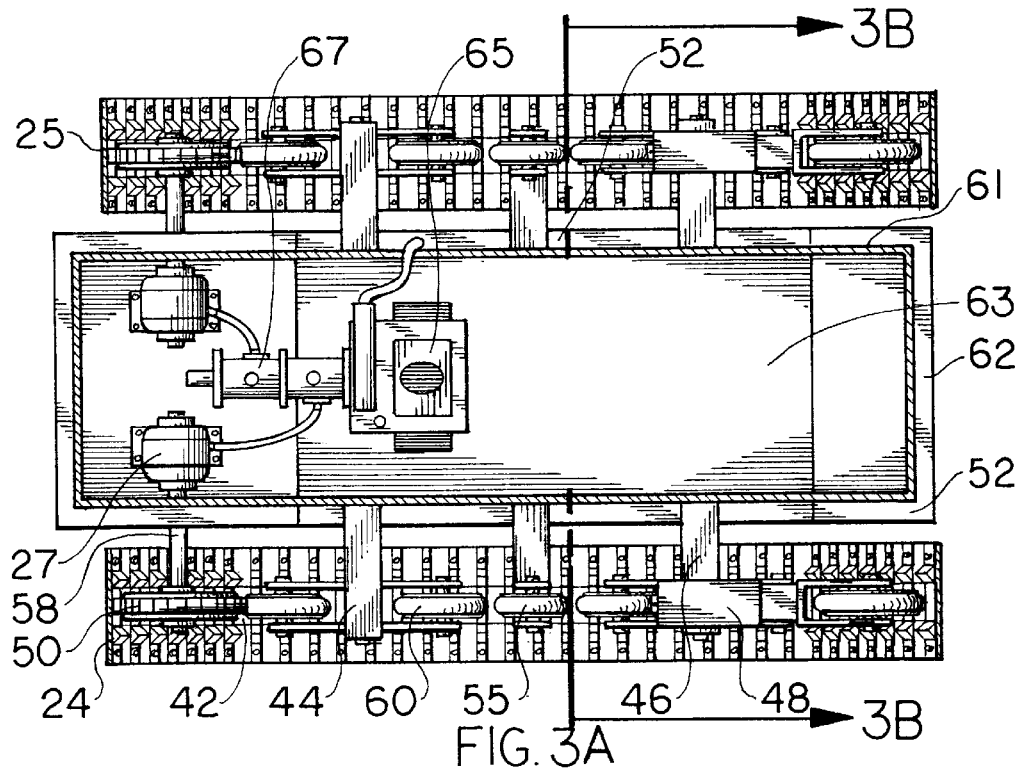
FIG. 3A is a section cut according to line 3A—3A of FIG. 2.
Figure 3B:
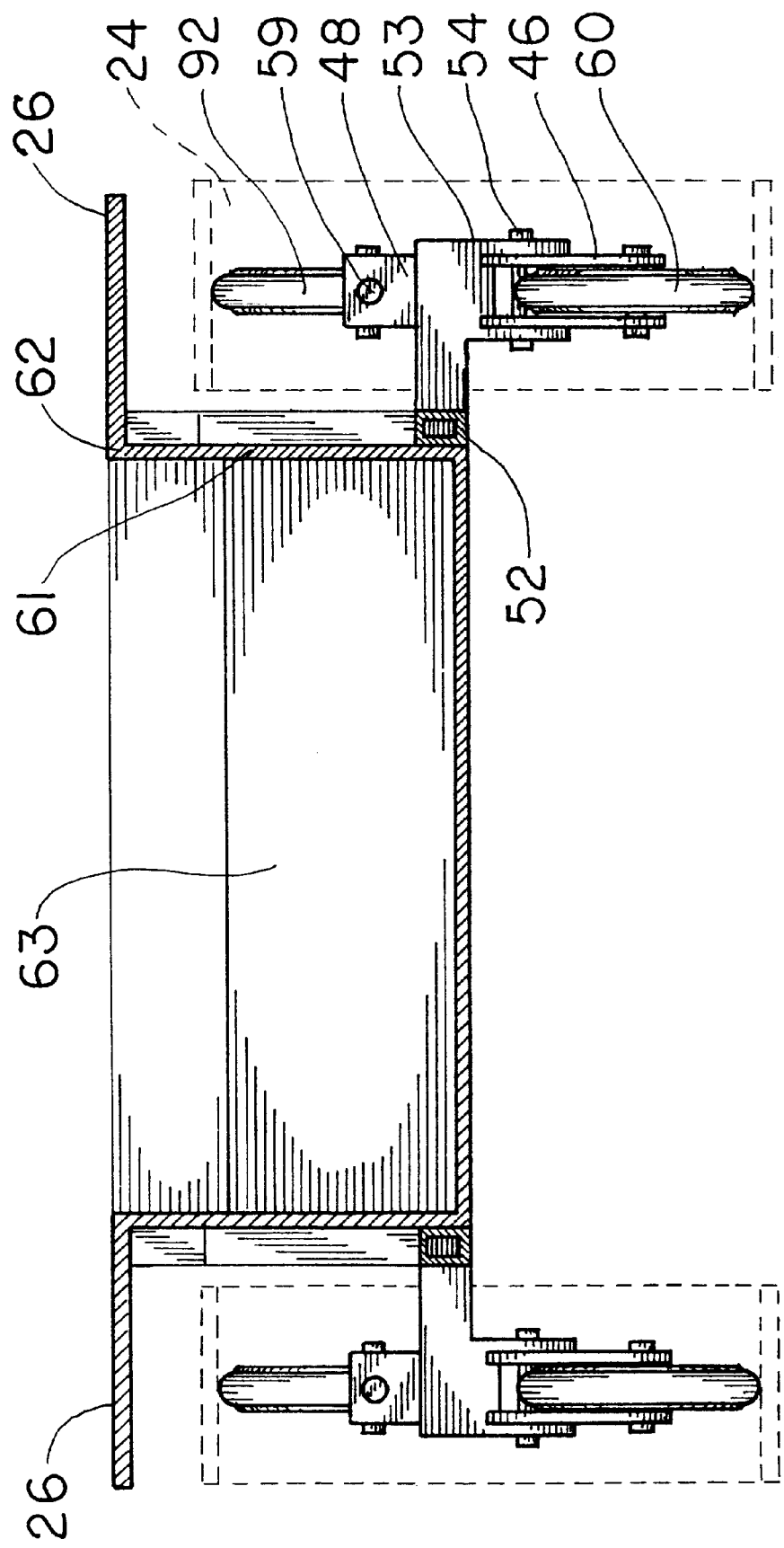
FIG. 3b is a section 3B—3B of FIG. 3A.

On FIG. 2 one sees a side-member of the rectangular frame 62 (FIG. 3A). Each tandem 44,46 includes a support 53 holding two arms 57 with a tandem spindle 54 for a tandem wheel 60 (FIG. 3A). A support wheel 55 is attached to the side-member and supports the track 24. One also sees a hydraulic jack 56 emerging from the frame 26 and activating the log shovel 32. Positioner 48 includes a movable member 90 (FIG. 5) longitudinally adjusted by a member 59 and locked by a locking pin 71.

FIG. 3A shows the two similar tracks 24,25 on both sides of the vehicle 20, two hydraulic motors 27 for driving the respective toothed wheel 50 through a motor axle 58. One also sees the two tandems 44,46 of which the wheels 60 are aligned in a tread 42. Inside the rectangular frame 62, is fitted a tub 63 having side walls 61 forming wings at their upper ends. Tub 63 receives an internal combustion engine 65 driving hydraulic pumps 67 actuating hydraulic motors 27. Tub 63 also contains fuel tank 129 and a hydraulic reservoir. The driver's seat 124 and control levers 130,132 are also mounted in tub 63.

FIG. 4A illustrates the tandem wheel 60 having a sectional shoe 64 engaged in the tread 42 placed at an angle 66, the angle resulting from the passage of the pad 33 on a gradient on the ground corresponding to the angle 66. One also sees the wheel guides 36 maintaining the engagement of the tandem wheel 60 in tread 42. FIG. 4C shows that bands or belts 38,40 have an equal width and are sandwiched between the traction bars 34 and wheel guides 36 forming pads 33. Each traction bar 34 is straight, , and has a U-shaped cross-section with its bight 34A applied against the external face of belts 38, 40 and its two flanges 34B outwardly directed to penetrate the ground. Traction bars 34 bridge the gap between belts 38 and 40 and terminate at the outer longitudinal edges 38A,40A of belts 38,40. Each wheel guide 36 is, formed into an inner hollow guide portion 36A of triangular cross-section and a straight extension 36B which is co-planar with the base 36C of guide portion 36A, and which, together with base 36C is applied flat against the internal surface of belt 38 or 40. Bases 36C terminate short of the inner longitudinal edges 38B, 40B of belts 38, 40 while extensions 36B terminate at the outer longitudinal edges 38A, 40A of belts 38, 40. The sides 36D of the two cooperating guide portions form oppositely inclined surfaces for engaging opposite flanks of wheels 60, 55 and 92 and of sprockets 50. The juxtaposed inner longitudinal edges 38B, 40B of belts 38, 40 clear the planes containing said oppositely inclined surfaces so that wheels 60, 55 and 92 will ride on the central section of traction bars 34 and not rub on belts 38, 40. FIGS. 4B and 4C show the fastening of traction bar 34 with belts 38, 40 and wheel guides 36 by bolts 68 and nuts 70. Bolt 68 extends through extension 36B, belt 38 or 40 and bight 34A of traction bar 34. The bolt-nut unit may be inverted when used and the nut 70 can be replaced by an optional spike 72.

A fixing bolt 74 appears under the portion guide 36A to add resistance and prevent the guide 36 from turning. Bolt 74 protrudes with the hollow part of the triangular guide portion 36A. There is a central reinforcement strip 76 located in the concave interior 78 of the traction bar 34 and welded thereto.

Figure 5:
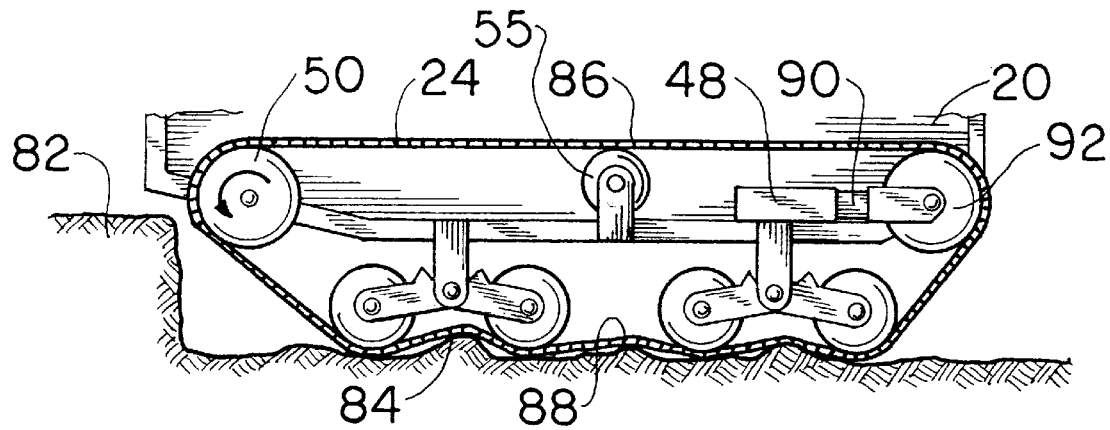
FIG. 5 is a side view of the vehicle negotiating obstacles

FIG. 5 shows a lateral view of the all-terrain vehicle 20 coming up against an obstacle 82. One also sees the toothed wheel 50, off centre toward the top, to give a better grip against the obstacles.

One also sees the track 24 passing on bumps 84 and unevenness of the ground resulting in an oscillation of tandems 44,46 from top to bottom, a tough side 86 in the upper part of the track 24, a slack side 88 in the lower part of the track 24.

One also sees the positioner 48 with a movable part 90 that positions a return wheel 92 subject to the tough side 86 tension FIG. 6 shows the all-terrain vehicle 20 transformed into a transport when coupled to the trailer 22, surmounted by a loader 94 as well as by the arrangement of the tandem suspension 96 with a buffer or stump arrester 97 and the arrangement of the swan neck 98 beam. A log shovel 140 may be placed in front and have a lifting jack 142.

Figure 7:
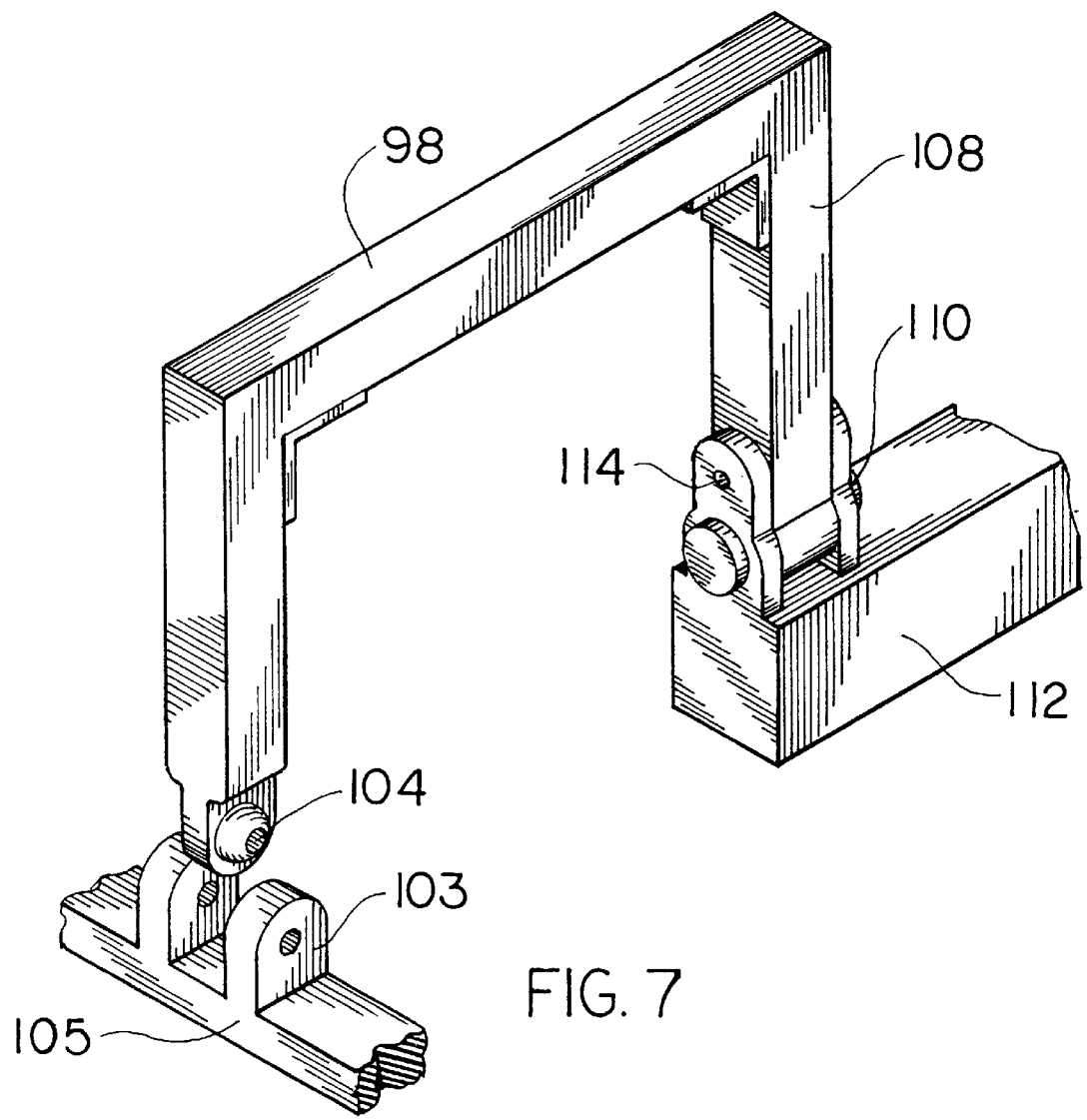
FIG. 7 is a detail of the area of arrow 7 of FIG. 6.

FIG. 7 illustrates a detail of the swan neck 98 beam with a ball pivot 104: the swan neck 98 has a lateral clearance pivot 110 that joins swan neck arm 108 to main girder 112 of trailer 22. A locking port 114 allows the blocking of the lateral clearance pivot 110.

Figure 8:
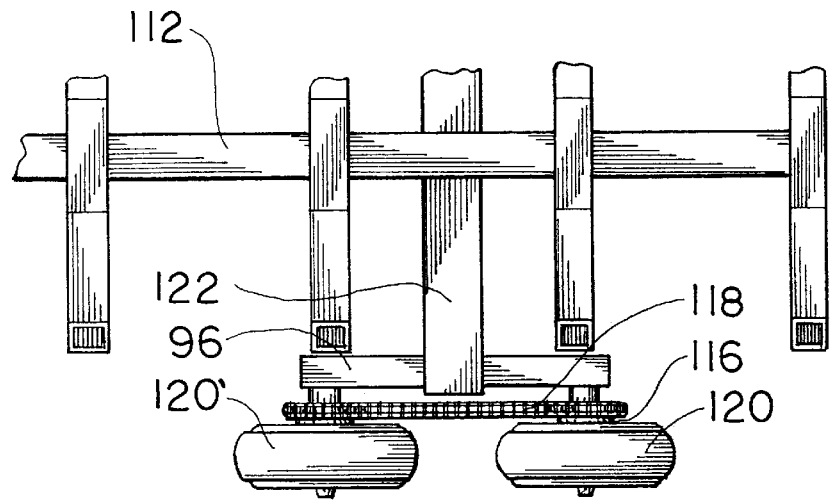
FIG. 8 is a detail of the area of arrow 8 of FIG. 6.

FIG. 8 illustrates the tandem suspension 96 in a top view. The toothed wheels 116 synchronise, through a chain 118, the rotation of two trailer wheels 120. A cross girder 122 joins the two tandem suspensions 96 to the main girder 112.

The propelling and steering are assured by two variable hydrostatic transmissions of which an axle 58 controls the motion of the toothed wheel 50 that moves the track 24. The innovative particularities consist in the arrangement of traction and suspension elements as well as the arrangement of stoppers 33 that gear in the toothed wheel 50 for the transmission of the strength to the ground.

A trailer 22 that may be coupled to the apparatus comprises a chain system 118 to synchronise the rotation of trailer wheels 120 of the tandem of each trailer 22, as well as for using as a buffer 97 between the trailer wheels 120, preventing the trailer wheels 120 to choke up on angular obstacles as bumps 84, without the help of chains on the periphery of the trailer wheels 120 of the tandem , chains that have to be removed during circulation on paved road. This trailer 22 may also serve for transportation of all-terrain vehicle 20 on the roads when traffic lights are installed. The all-terrain vehicle 20 comprises, on the left of the frame 26, a side-member of the frame 52 on which is mounted a hydraulic motor 27 connected across the side-member of the frame 52, a toothed wheel 50 and likewise on the right side. On each side there is also a pair of tandem supports 53 that have a pivot 54 to receive a front tandem 44 and a rear tandem 46. The all-terrain vehicle 20 being easily transportable has small dimensions such as 1.20 m large by 2.40 m long, basic net weight of 1000 kg, for the utilisation in the dimensions of a light typical truck box.

The traction and hydrostatic steering allow a speed ranging from 0 to 10 km/hr without knocking and the steering is assured by the speed change and/or the independent rotation or inversion of the left track 24 or right track 25.

Such left or right track 24,25 comprises a steel toothed wheel located in front and inside the track, two oscillating front and rear tandem 44,46 located in the central part of the track and a return wheel 92 used as positioning wheel located at the back and inside the track. The track is flexible and made of two reinforced elastomeric bands 40, external and internal, tied together by stoppers 33, assuring the transmission of the power of the toothed wheel 50 to the elastomeric bands 38,40 and the grip to the ground.

The stoppers 33 are also provided on their upper part with two triangular wheel guides 36 allowing the track 24 to stay engaged on the toothed wheel 50 as well as on the front and rear tandems 44,46 and on the return wheel that is located behind.

The profile of the sectional shoe 64 of the wheels and wheel guides 36 is designed to keep the wheel's engagement on the lateral canting of the track 24 up to an angle of 45 degrees, and even angles beyond 45 degrees—FIG. 4A—

The stopper 33 has a concave interior 78 to assure the hold of the ground and comprises a central reinforcement 76 to reduce the shearing of the ground that a T-shaped stopper could have produced. The central reinforcement 76 joins the two sides of the stopper 33 that are under both elastomeric bands 38,40.

The bolts 68 and fixing bolts 74 join a wheel guide 36, the corresponding elastomeric band and the lower part of the stopper corresponding side 34. The nuts 70 can be frayed to become crampon for the ice.

If necessary, the concave interior 78 of lower part of the stopper 33 can be modified for a particular utilization (FIG. 4C) as, for example, for sand, snow, mud, peat, to increase the lift on the ground, and mostly the shearing stress so it does not become a break traction when sliding or meeting other damaging effects of the ground.

Another element has an influence on the lift of the apparatus—FIG. 5—namely the arrangement of toothed-wheel 50, tandems 44,46, return wheel 92 and positioner 48. As a matter of fact, the toothed wheel 50, located at the front transmits the power of traction by applying a tension on the upper bands, that is on the side with the tough side 86, letting the lower part, the soft side 88 of the conducted track increase the length of the track touching the ground.

This geometry, added to the vertical action of the tandems also give the track a better grip of the ground and reduces the shaking on hilly ground, as variations are softened by the tandems and not by the body of the machine.

The using of a soft side on the ground also allows to neutralize the effect of derailment of the track when objects are passing between the wheels and bands. Some tests demonstrate that a small log of 7 cm diameter can go around, between the track and wheels, without causing a derailment, and without an excessive stress on the bands.

The utilisation of a toothed wheel oriented upwardly and a positioner of small diameter allows to maintain a ground clearance of 34 cm, that is the distance on the ground under the side-member of the frame 52, which is exceptional for an apparatus of this size—FIG. 5—. This vehicle model possesses a gradability threshold going up to 40 cm, that is 5 cm under the toothed wheels center; this vehicle can go over a 40 cm obstacle. A vehicle conceived according to the same principles but bigger would overcome taller obstacles.

These principles assure a traction allowing traction stress equivalent to that of the weight of the apparatus, and even on hilly ground, which allows its use in most off road work or transport situations. The installation of a hydraulic power outlet allows an adjoining of apparatus for excavation, prospection or other.

The first objective was to simulate a horse's movement and replace it for lumbering i.e. carrying wood from pre-commercial or selective cuts. One can add a log shovel at the front that may also serve for shovelling snow and removing objects, the log shovel 32 and a rear plate, allowing to tie trees, with chains and/or slings, on a notched horizontal plate, to lift its extremity to carry them to the storing ground and pile the logs on a pile with the log shovel 32, either the front or the back one.

One can add to the apparatus a towing winch to bring to the apparatus some inaccessible objects, in flooded or scarped areas.

The other forestry vocation of a tracked vehicle is the unloading of trunks already trimmed and cut in lengths, ready for sawing.

Most companies require that the wood be carried, instead of hauled, especially in very muddy areas and/or when storing sites are far. The apparatus is then coupled to a trailer surmounted by a wood loader and racks and/or a platform.

The trailer 22 is attached to an all-terrain tracked vehicle 20 by a swan neck 98 beam mounted on a lateral clearance pivot 110 located on a main girder 112 of the trailer 22 and attached to a capping 103 by a pivot and pin 104, the capping 103 turning on a fastening bar 105 around a vertical bolt. There is a clearance of ±90 degrees longitudinally of the lateral clearance pivot 110 by comparison to the main girder 112.

The arrangement is planned to prevent the trailer, that has a load of approximately four tons, from dragging the tracked vehicle along if it overturns.

The rear lateral clearance may be blocked for operation on paved roads and at higher speed when the pin 104 is replaced by a conventional trailer attach.

The trailer is made from a main girder 112 topped by racks or other method for maintaining a load, and placed on a cross-girder 122 under which are installed two particular tandems 96, of the same width as the apparatus, and with the same ground clearance, 34 cm, even if the tandems 96 are equipped with tires of 50 cm in diameter and are 25 cm wide, a width slightly smaller than the one of the track 24, that can have some 30 cm to minimize the dragging effect.

To assure a better manageability, the tandem suspension 96 has toothed wheel 116, of a diameter of 20 cm, on each trailer wheel 120; the trailer wheels 120 are attached together by a chain 118 of strong caliber. This system, coupled to the tandem effect, allows the trailer to move forward without knocking when the wheels meet some obstacles, the rear wheel helping the front wheel and vice-versa, depending on if the vehicle moves forward or in reverse. If the tandem 96 lifts at the front, it transmits a rotation at the rear that makes the front trailer wheel 120 turn.

To compensate the jamming of tandems 96 on sharp obstacles like a bump 84, a buffer 96 can be added between the two trailer wheels 120, with a space of 10 cm above the tangent of two trailer wheels 120 to prevent sticking. This system toothed wheel-buffer and chain replaces the peripheral chains currently used, without having the trouble they cause, especially while on hard surfaces that induce a lot of vibrations and cracking of the frame and make the trailers unusable on paved road; an operation that can waste a lot of time.

Different Embodiments

My invention is a track for off-road vehicles, comprising:

a pair of elastomeric bands 38,40 having a typical width of 4" and more and disposed parallel and to a certain distance of each other, a number of stoppers 33 equally disposed, according to a spacing, like 8 cm, in relation with the diameter of a drive wheel, typically of 25 cm, each of stoppers around the bands include:

a traction bar 34 installed transversally and outside of the elastomeric bands, the traction bar covering the width of the bands and the distance between them, two triangular guides 36 installed inside the band and spaced to receive successively, on a tread 42, a number of suspension wheels installed in a same plane, a typical space between guides may be of 10 cm, a fixing bolt 74 to fix the guides and traction bar across the band.

The traction bar 34 comprises a central reinforcement 76 to join structurally the two triangular guides 36 under the tread 42. The traction bar 34 also comprises a concave interior 78 to assure a lift and ground traction of the off-road vehicle. The concave interior 78 has a depth equal to 50% of the width. The traction bar 34 comprises a central section under the tread 42 of which a lower part holds the central reinforcement 76 and an upper part of a generally roundish shape to engage into the toothed traction wheel 50.

The triangular guides 36 have a height equivalent to half the width of the tread. The triangular guides 36 have an angle of 30° with the vertical.

A number of wheels are disposed in a plane to operate within a tread 42; the all-terrain vehicle has at least one toothed wheel 50 to engage a central part of the traction bar 34 of the track 24.

An all-terrain vehicle comprising in combination:

a central frame 26 having two frame sides 52 comprising:
 a toothed wheel 50 at the front to serve as transmission,
 two suspension tandems 44,46 pivotedly mounted to the frame, each tandem comprising a pair of wheels aligned with the plane and free to move, a rear return wheel 92 comprising positioning means 48 mounted on the frame to hold a position of the wheel within the plane, a track to circle, without pre-tension, the wheels and tandems, the track comprising stoppers with stopper guides, on both sides of the wheels.

It is well understood that the embodiment of the present invention that has been described above in reference to the annexed drawing, has been given as indicative and by no means limitative, and that some modifications and adaptations may be brought without departing from the object of the present invention. Other embodiments are possible and limited only by the scope of the appended claims:

What is claimed is:

1. A vehicle comprising a front part adapted to be engaged by aligned tandem wheels and by a front drive sprocket in line with said wheels, said sprocket being of smaller diameter than said wheels, each track comprising two spaced apart, parallel, elastomeric belts of equal width and having juxtaposed continuous longitudinal inner edges and continuous longitudinal outer edges, a series of transverse, parallel straight ground contacting traction bars longitudinally equally spaced along outer surfaces of said belts, said traction bars bridging said belts and terminating at said outer edges, each traction bar having a U-shaped cross-section defining a bight portion applied against said outer surfaces of said belts and two flange portions outwardly directed to penetrate the ground and provide traction, respective rows of which guides longitudinally equally spaced on respective inner surfaces of said belts and in register with said traction bars, of said belts, fasteners extending through said wheel guides, through said belts and through said bight portions of said traction bars, and securing the respective belts in sandwich between said traction bars and the wheel guides of the respective rows, each wheel guide consisting of a flat bar having one end portion shaped to form a hollow guide portion of a triangular section, said fastener extending through said hollow guide portion, the wheel guide having a second end portion which is straight and forms an extension of one side of said guide portion, said extension terminating at the outer longitudinal edge of the respective belt, said guide portions having a second side forming oppositely inclined surfaces engaging opposite flanks of said tandem wheels, said inclined surfaces clearing said longitudinal inner edges of said belts thereby forming a wheel reception area, the height of said reception area being equal to the thickness of said belt plus the height of said inclined surfaces.

2. The vehicle defined in claim 1, wherein a first set of said fasteners protrude within said hollow guide portions and a second set of said fasteners extends through said extensions.

3. The vehicle defined in claim 2, further including reinforcement strips extending within and secured to said U-shaped bars, intermediate the fasteners of said first set.

* * * * *